(12) United States Patent
Ouchi et al.

(10) Patent No.: US 8,421,932 B2
(45) Date of Patent: Apr. 16, 2013

(54) APPARATUS AND METHOD FOR SPEECH RECOGNITION, AND TELEVISION EQUIPPED WITH APPARATUS FOR SPEECH RECOGNITION

(75) Inventors: Kazushige Ouchi, Saitama-ken (JP); Miwako Doi, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/332,697

(22) Filed: Dec. 21, 2011

(65) Prior Publication Data
US 2012/0162540 A1  Jun. 28, 2012

(30) Foreign Application Priority Data

Dec. 22, 2010  (JP) ................................ P2010-286759

(51) Int. Cl.
*H04N 5/44* (2011.01)
(52) U.S. Cl.
USPC .......................................... 348/734; 348/705
(58) Field of Classification Search .................. 348/734, 348/705–706, 552, 725, 736, 738; 704/825.22, 704/825.25, 825.24, 825.72; 340/275, 251
See application file for complete search history.

(56) References Cited

U.S. PATENT DOCUMENTS

| 6,112,174 | A * | 8/2000 | Wakisaka et al. ............. 704/251 |
| 6,188,985 | B1 * | 2/2001 | Thrift et al. .................... 704/275 |
| 6,408,272 | B1 * | 6/2002 | White et al. ................. 704/270.1 |
| 6,487,534 | B1 | 11/2002 | Thelen et al. |
| 6,738,743 | B2 | 5/2004 | Sharma et al. |
| 7,023,498 | B2 * | 4/2006 | Ishihara ......................... 348/734 |
| 7,174,299 | B2 | 2/2007 | Fujii et al. |
| 8,106,750 | B2 * | 1/2012 | Cho et al. ..................... 340/12.5 |
| 2010/0076753 | A1 | 3/2010 | Doi et al. |
| 2010/0076763 | A1 | 3/2010 | Ouchi et al. |
| 2011/0301950 | A1 | 12/2011 | Ouchi et al. |

FOREIGN PATENT DOCUMENTS

| JP | 2002-182896 | 6/2002 |
| JP | 2003-195880 | 7/2003 |

OTHER PUBLICATIONS

U.S. Appl. No. 13/430,264, filed Mar. 26, 2012, Ouchi et al.

* cited by examiner

*Primary Examiner* — Trang U Tran
(74) *Attorney, Agent, or Firm* — Oblon, Spivak, McClelland, Maier & Neustadt, L.L.P.

(57) ABSTRACT

An embodiment of an apparatus for speech recognition includes a speech input unit configured to acquire acoustic signal, a first recognition unit configured to recognize the acoustic signal, a communication unit configured to communicate with an external server, a second recognition unit configured to recognize the acoustic signal by utilizing the external server via the communication unit, and a remote signal input unit configured to acquire a control signal from a remote controller. The switching unit is configured to switch between the first recognition unit and the second recognition unit for recognizing the acoustic signal in response to a start trigger. The switching unit selects the second recognition unit when the start trigger is detected from the control signal, and the switching unit selects the first recognition unit when the start trigger is detected from the acoustic signal.

7 Claims, 12 Drawing Sheets

Fig.5

| CONTENTS OF TELEVISION CONTROL | RECOGNITION VOCABULARY (in Japanese with Roman characters) | RECOGNITION VOCABULARY (in English) |
|---|---|---|
| SWICTH TO CHANNEL ONE | ICCHAN | CHANNEL ONE |
| SWITCH TO CHANNEL ONE | ENUECHIKE- | nhk |
| SWITCH TO CHANNEL TWO | NICHAN | CHANNEL TWO |
| SWITCH TO CHANNEL TWO | KYOUIKUTEREBI | etv |
| ... | | |
| TURN UP THE TV | APPU | UP |
| TURN UP THE TV MORE LOUDLY | APPUAPPU | UP UP |
| TURN DOWN THE TV | DAUN | DOWN |
| TURN DOWN THE TV MORE QUIETLY | DAUNDAUN | DOWN DOWN |
| SET THE VOLUME TO LOWER LEVEL | CHIISAME | LOW |
| SET THE VOLUME TO MEDIUM LEVEL | HUTSUU | MEDIUM |
| SET THE VOLUME TO LOUD LEVEL | OKIME | LOUD |
| MUTE THE VOLUME | MYU-TO | MUTE |
| ... | | |
| TURN ON THE TV | DENGENOHU | TURN ON |
| TURN OFF THE TV | OHU | TURN OFF |
| ... | | |

Fig.6

| CONTENTS OF TELEVISION CONTROL | RECOGNITION VOCABULARY (in Japanese with Roman characters) | RECOGNITION VOCABULARY (in English) |
|---|---|---|
| DISPLAY WEAHTER REPORT FOR TODAY | TENKIYOHOU | WHEATHER REPORT |
| DISPLAY WEAHTER REPORT FOR TODAY | KYOUNOTENKI | TODAY'S WEATHER |
| DISPLAY WEAHTER REPORT FOR TOMMORROW | ASHITANOTENKI | TOMMORROW'S WHEATHER |
| DISPLAY WEAHTER REPORT FOR THIS WEEK | KONSHUUNOTENKI | THIS WEEK'S WEATHER |
| ⋮ | | |
| DISPLAY SPORTS NEWS | SUPO-TSU | SPORTS |
| DISPLAY BASEBALL NEWS | YAKYUU | BASEBALL |
| DISPLAY RESULT OF GIANTS' GAME | KYOJIN | GIANTS |
| DISPLAY SOCCER NEW | SAKKA- | SOCCER |
| ⋮ | | |
| DISPLAY CURRENT EXCHANGE RATE | ENSOUBA | EXCHANGE RATE |
| ⋮ | | |
| DISPLAY TIME TABLE OF NEAR BUS STOP | BASU | BUS |
| DISPLAY TIME TABLE OF NEAR STATION | DENSHA | TRAIN |
| ⋮ | | |

Fig.8

| LIST OF TV PROGRAMS | |
|---|---|
| 10/12 06:00~ | MORNING NEWS BY TARO TOSHIBA |
| 10/12 19:00~ | KADENCHAN |
| 10/13 18:00~ | NETWORK NEWS |
| 10/14 06:00~ | MORNING NEWS BY TARO TOSHIBA |
| 10/15 06:00~ | MORNING NEWS BY TARO TOSHIBA |
| 10/15 14:00~ | INNOVATION HOUR |
| 10/16 06:00~ | MORNING NEWS BY TARO TOSHIBA |
| 10/16 20:00~ | SPORTS FANTASY |
| 10/17 06:00~ | MORNING NEWS BY TARO TOSHIBA |
| 10/18 06:00~ | MORNING NEWS BY TARO TOSHIBA |

APPARATUS AND METHOD FOR SPEECH RECOGNITION, AND TELEVISION EQUIPPED WITH APPARATUS FOR SPEECH RECOGNITION

CROSS-REFERENCE TO RELATED APPLICATION

This application is based upon and claims the benefit of priority from Japanese Patent Application No. 2010-286759 filed on Dec. 22, 2010, the entire contents of which are incorporated herein by reference.

FIELD

Embodiments described herein relate generally to an apparatus and a method for speech recognition, and a television equipped with an apparatus for speech recognition.

BACKGROUND

Speech recognition is a technique for recognizing user speech and executing desired tasks as an alternative to manual operation or character input. Previously, mainly used was a client-based speech recognition, which executes a recognition process by utilizing a resource of a local device. Recently, due to increase in network bandwidth and the advent of distributed processing techniques, it has become common to use a server-based speech recognition for recognizing user speech. Server-based speech recognition involves sending user speech inputted from a microphone embedded on a local device (or features extracted from the user speech) to an external server connected via network and executing a part of the recognition process by utilizing a resource of the external server.

The client-based and the server-based speech recognitions have contrasting features. The client-based speech recognition, which is not connected to the external server, has a quick response, but has a difficulty in handling large recognition vocabulary because of the limited resource of the local device. On the other hand, the server-based speech recognition, which is connected to the external server with high computing power, is able to handle a large recognition vocabulary, but has slower response because of the communication with the external server.

In this way, it is preferable to switch between the client-based and the server-based speech recognitions based on the purpose of the speech recognition. Conventionally, the user needs to switch between the client-based and the server-based speech recognitions by pushing a button of a remote controller. Accordingly, it forces the user to be clearly conscious of the switching between two different speech recognitions.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings, wherein:

FIG. 5 is a table of examples of recognition vocabulary for television control.

FIG. 6 is a further table of examples of recognition vocabulary for television control.

FIG. 8 is an example of a list of TV programs displayed on the display.

DETAILED DESCRIPTION

Figure 1:
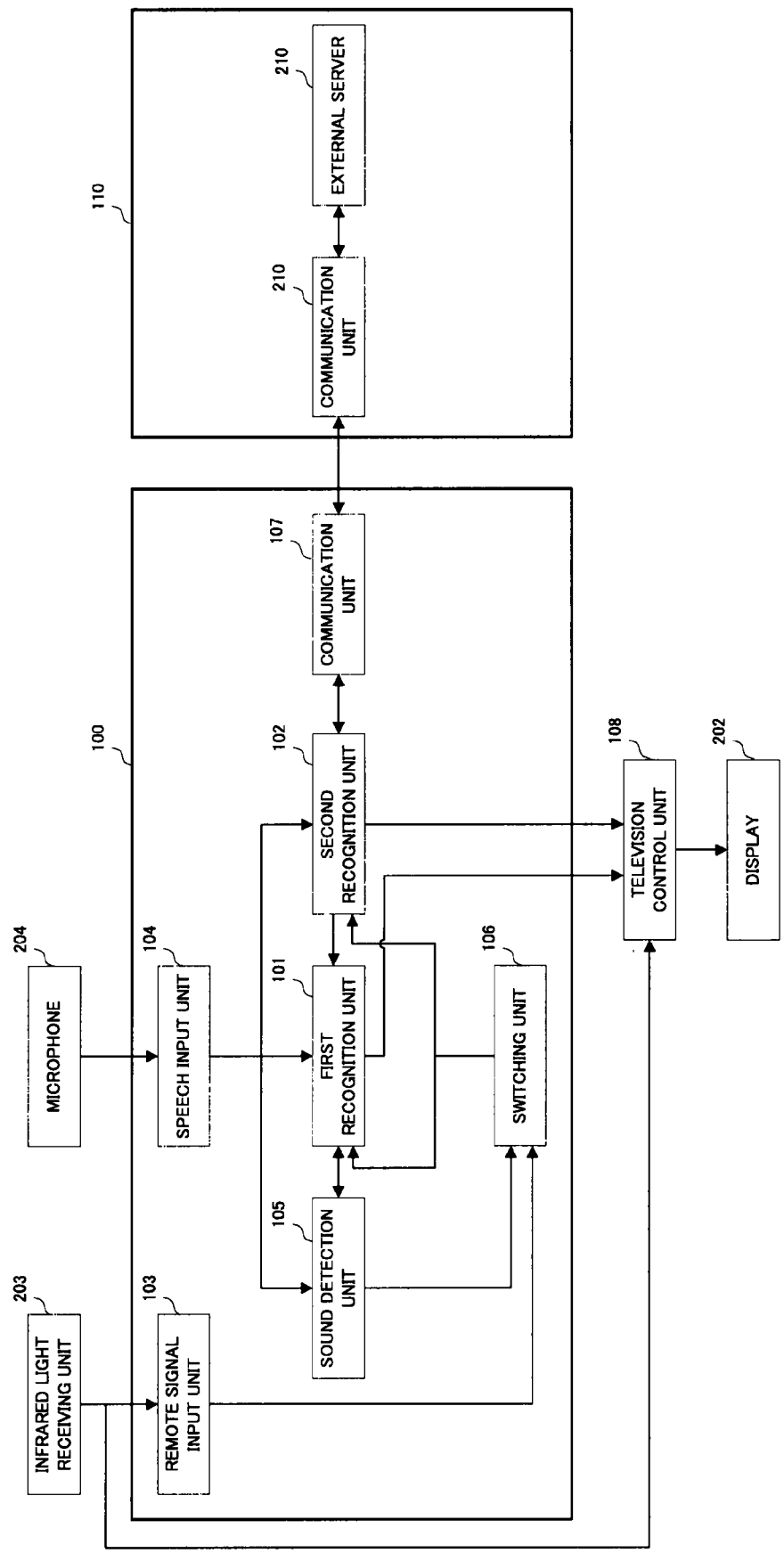
FIG. 1 is a block diagram of an apparatus for speech recognition according to a first embodiment.

According to one embodiment, an apparatus for speech recognition includes a speech input unit, a first recognition unit, a communication unit, a second recognition unit, a remote signal input unit and a switching unit. The speech input unit is configured to acquire an acoustic signal. The first recognition unit is configured to recognize the acoustic signal. The communication unit is configured to communicate with an external server. The second recognition unit is configured to recognize the acoustic signal by utilizing the external server via the communication unit. The remote signal input unit is configured to acquire control signal from a remote controller. The switching unit is configured to switch between the first recognition unit and the second recognition unit for recognizing the acoustic signal in response to a start trigger. The switching unit selects the second recognition unit when the start trigger is detected from the control signal, and the switching unit selects the first recognition unit when the start trigger is detected from the acoustic signal.

Various embodiments will be described hereinafter with reference to the accompanying drawings, wherein the same reference numeral designations represent the same or corresponding parts throughout the several views.

(The First Embodiment)

Figure 2:
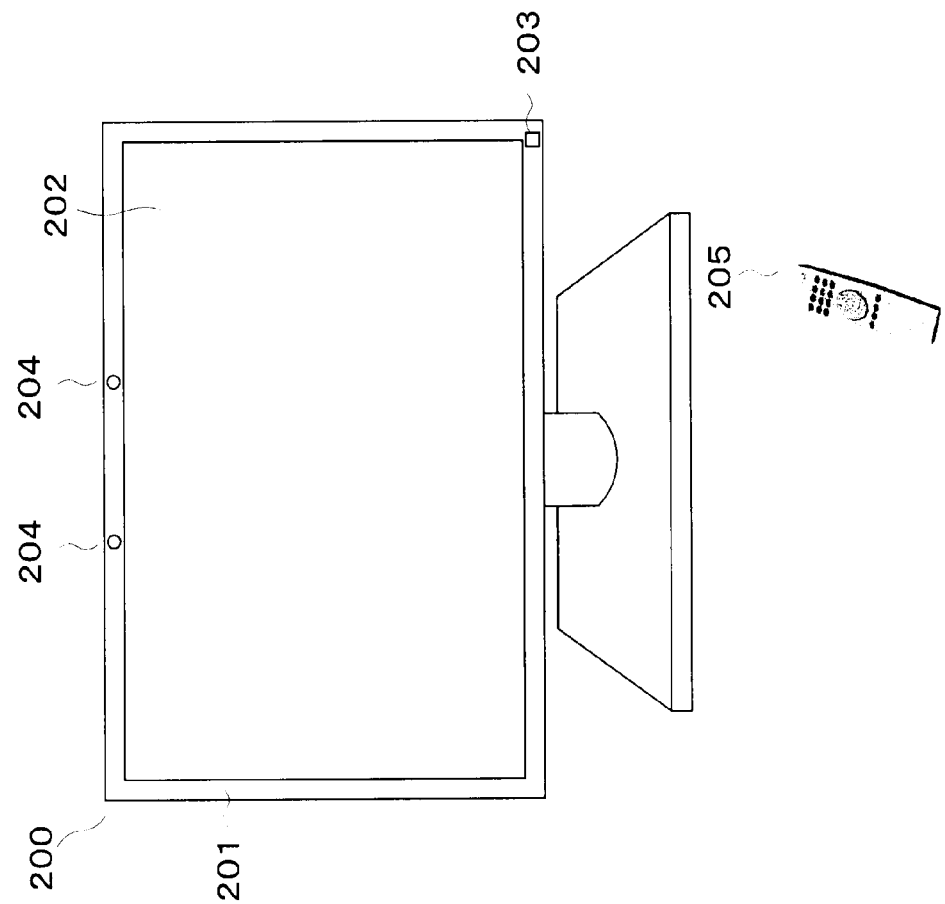
FIG. 2 is a general illustration of an appearance of a television according to the first embodiment.

FIG. 1 is a block diagram of an apparatus 100 for speech recognition, which is embedded on a television 200. FIG. 2 is a general illustration of the appearance of the television 200. The first embodiment assumes that user controls the television 200 or searches a content of TV program listing by user's speech. The apparatus 100 includes both a first recognition unit 101 and a second recognition unit 102. The first recognition unit 101 is the client-based speech recognition and the second recognition unit 102 is the server-based speech recognition. Both the first recognition unit 101 and the second recognition unit 102 start to recognize the user's speech when a start trigger, which is a trigger from the user to start recognition, is detected. In this embodiment, the user is able to activate the start trigger by pushing a button of a remote controller (button trigger) or generating predefined sound (sound trigger). The predefined sound is user speech or sound generated by user action such as handclaps. For recognizing the user speech, the apparatus 100 selects which of the first recognition unit 101 and the second recognition unit 102 to use in response to the start trigger detected by the apparatus 100. In particular, the apparatus 100 utilizes the second recognition unit 102 when a button trigger is detected. The apparatus 100 utilizes the first recognition unit 101 when a sound trigger is detected.

The television 200 of FIG. 2 includes a body 201 to hold the television 200, a display 202 to display information, two microphones 204 to input acoustic signal (the user speech and the predefined sound), a remote controller 205 to send control signal by infrared light, and an infrared light receiving unit 203 to receive the infrared light from the remote controller 205.

The apparatus 100 of FIG. 1 includes the first recognition unit 101, the second recognition unit 102, a remote signal input unit 103, a speech input unit 104, a sound detection unit 105, a switching unit 106, and a communication unit 107.

The remote signal input unit 103 acquires the remote signal from the remote controller 205. The speech input unit 104 acquires the acoustic signal. The sound detection unit 105 detects the predefined sound from the acoustic signal acquired by the speech input unit 104. The switching unit 106 switches between the first recognition unit 101 and the second recognition unit 102 based on the control signal inputted to the remote signal input unit 103 and the predefined sound detected by the sound detection unit 105. The communication unit 107 communicates with an external server 110.

A television control unit 108, which is embedded on the television 200, controls the television 200 based on recognition results from both the first recognition unit 101 and the second recognition unit 102. The second recognition unit 102 is connected to the external server 110 via the communication unit 107. The external server 110 includes a communication unit 111 to communicate with apparatus 100 and a processing unit 112 to execute a part of the recognition process of the second recognition unit 102.

(Hardware Component)

Figure 3:
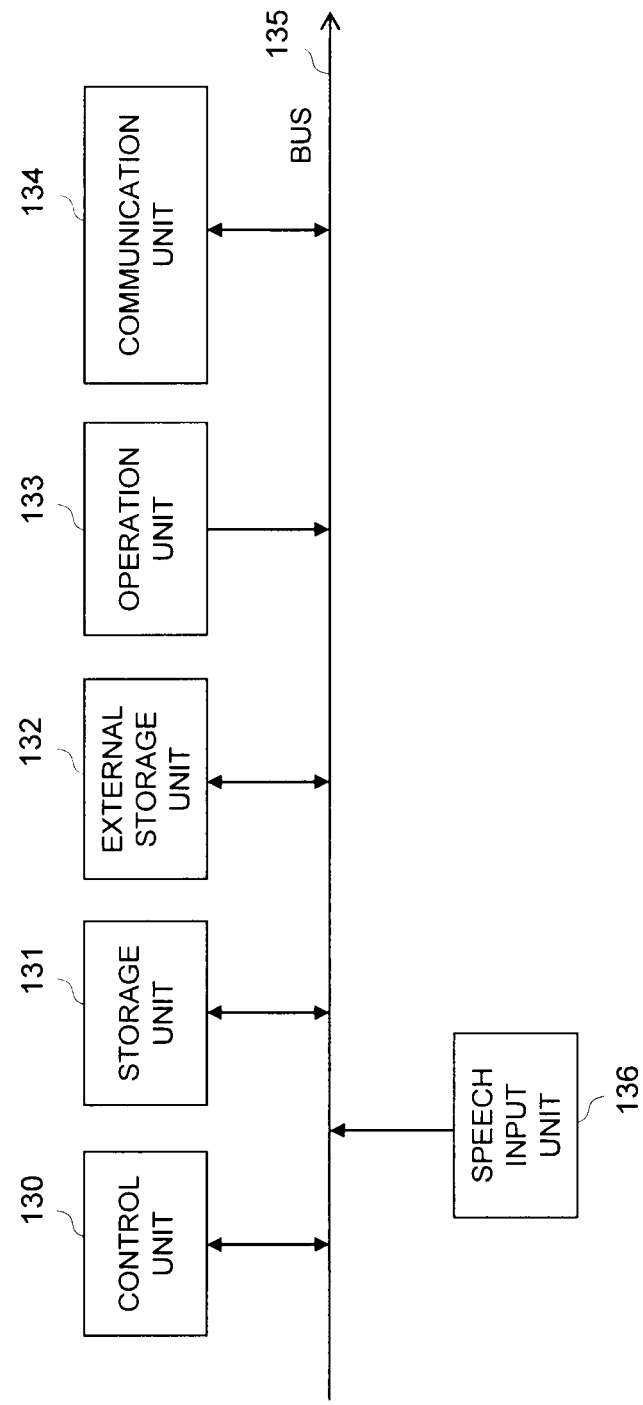
FIG. 3 is a system diagram of a hardware component of the apparatus in FIG. 1.

The apparatus 100 and the external server 110 are composed of hardware using a regular computer shown in FIG. 3. This hardware includes a control unit 130 such as a CPU (Central Processing Unit) to control the entire apparatus, a storage unit 131 such as a ROM (Read Only Memory) or a RAM (Random Access Memory) to store various kinds of data and programs, an external storage unit 132 such as a HDD (Hard Access Memory) or a CD (Compact Disk) to store various kinds of data and programs, an operation unit 133 such as a keyboard or a mouse to accept a user's indication, a communication unit 134 to control communication with an external apparatus, a speech input unit 136 such as a microphone to which speech is input, and a bus 135 to connect the hardware elements.

In such hardware, the control unit 130 executes various programs stored in the storage unit 131 (such as the ROM) or the external storage unit 132. As a result, the following functions are realized.

The remote signal input unit 103 acquires a start trigger by user's pushing a button of the remote controller 205 (button trigger) from the infrared light received by the infrared light receiving unit 203. The start trigger represents a trigger to start recognition. The speech input unit 104 acquires the acoustic signal from the two microphones 204. By utilizing microphone array technique, the speech input unit 104 may estimate a direction of the user speech and the predefined sound, and make directivity to the direction. The sound detection unit 105 detects a start trigger by the predefined sound (sound trigger) from the acoustic signal acquired by the speech input unit 104. The switching unit 106 switches between the first recognition unit 101 and the second recognition unit 102 in response to the button trigger acquired by the remote signal input unit 103 or the sound trigger detected by the sound detection unit 105. In this embodiment, the apparatus 100 utilizes the second recognition unit 102 when the button trigger is detected. The apparatus 100 utilizes the first recognition unit 101 when the sound trigger is detected. The second recognition unit 102 connects to the external server 110 via the communication unit 107, and executes a part of recognition process by utilizing the processing unit 112 of the external server 110. Both the communication unit 107 and the communication unit 111 are linked via wired or wireless network. The television control unit 108 receives recognition results from both the first recognition unit 101 and the second recognition unit 102, and performs controls on television 200, such as channel switching, or searching the content of TV program listing. The recognition results and information from the television control unit 108 are displayed on the display 202.

Figure 4:
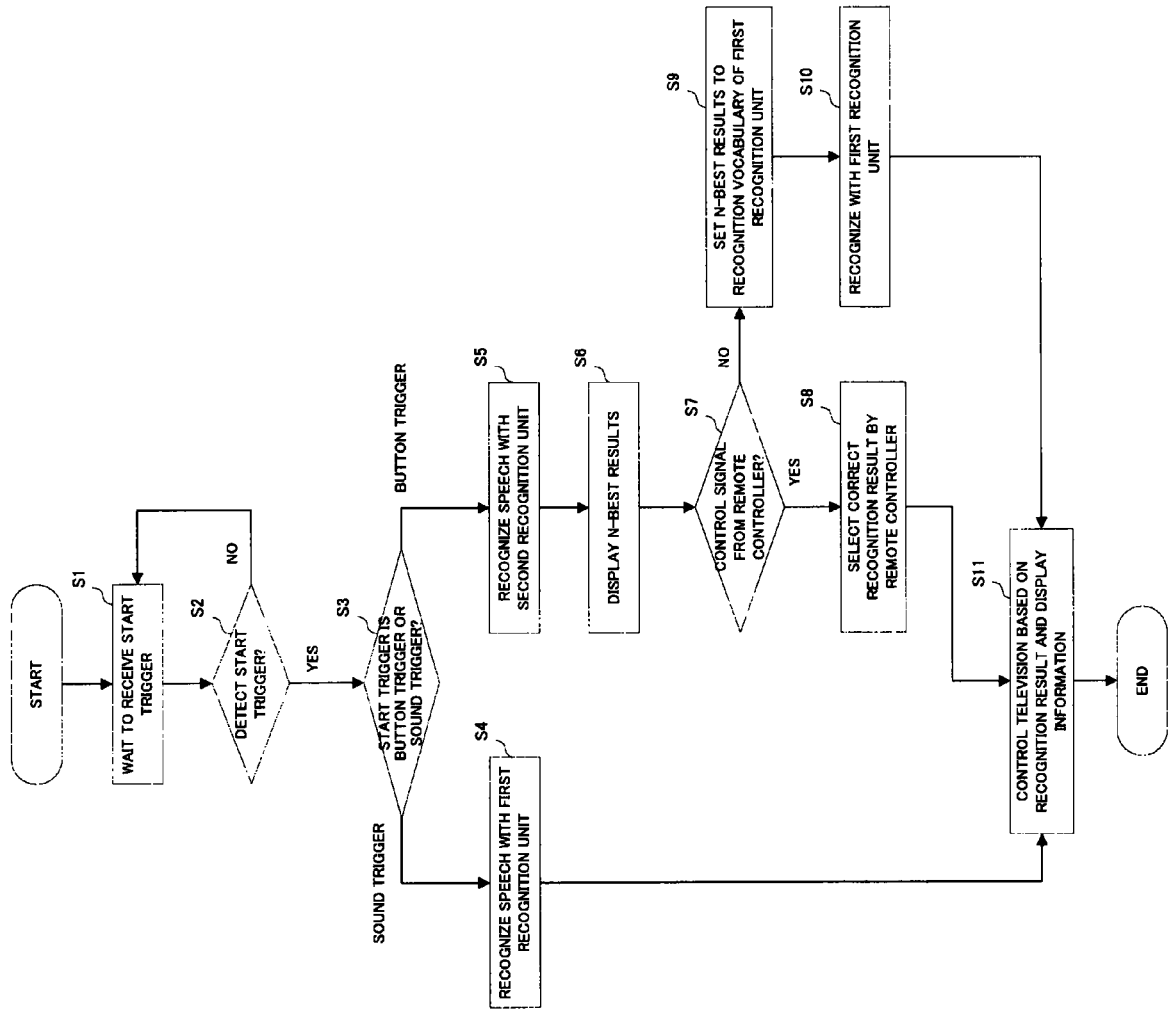
FIG. 4 is a system diagram of a flow chart illustrating processing of the apparatus according to the first embodiment.

FIG. 4 is a flow chart of processing of the apparatus 100 for speech recognition in accordance with the first embodiment. The apparatus 100 is embedded on the television 200, and enables the user to control the television 200 or search information such as the content of TV program listing by means of user speech. In this embodiment, the user understands that the sound trigger should be given when the user wants to control the television 200 and the button trigger should be given when the user wants to search information. As to the control of the television 200, the apparatus needs to store only about 100 to 200 words of recognition vocabulary, and requires quick response. As to the search of information, on the other hand, the apparatus 100 needs to store about one hundred thousand words of recognition vocabulary, and requires high computing power in order to obtain accurate recognition results. For recognizing the user speech, therefore, the apparatus 100 utilizes the first recognition unit 101 with client-based speech recognition for control of the television 200, and the second recognition unit 102 with the server-based speech recognition for the search of information. Furthermore, the second recognition units 102 outputs N-best results (N is greater than or equal to 2) in order to improve the likelihood that a correct recognition result is included in the recognition results from the second recognition units 102.

Referring to FIG. 4, the apparatus 100 waits to receive a start trigger from user (S1). In this embodiment, the user can give the start trigger to the apparatus 100 by the button trigger or the sound trigger. In order for the user to give the button trigger, it needs to assign a control signal of a start trigger to a predefined button of the remote controller 205.

The switching unit 106 detects whether or not the control signal from the remote signal input unit 103 includes button trigger (S2).

In the case of the sound trigger, the sound detection unit 105 detects the sound trigger from the acoustic signal acquired by the speech input unit 104, and sends detection results to the switching unit 106. The sound trigger is given by the user generating of the predefined sound. The predefined sound is the user speech of specific words such as "Hello, TV" or sound generated by the user actions such as handclaps and finger-snaps. As to the user speech of specific words, the sound detection unit 105 activates the first recognition unit 101 with recognition vocabulary consisted of the specific words. When recognition likelihood of the specific words becomes higher than predefined threshold, the sound detection unit 105 determines that the sound trigger is detected (S2). Alternatively, the sound detection unit 105 may utilize a recognition unit other than the first recognition unit 101.

As to the sound generated by the user's action, the sound detection unit 105 extracts power of the acoustic signal acquired by the speech input unit 104. The sound detection unit 105 detects the sound trigger based on predefined rules such as whether the power becomes higher than predefined threshold or not, and the power exceeds the predefined threshold two successive times or not. In this way, the sound detection unit 105 can decrease the number of false detections caused by noise such as things dripping and door closing sound.

The switching unit 106 switches both the first recognition unit 101 and the second recognition unit 102 based on detection results of the start trigger (S3). In this embodiment, when the start trigger is the sound trigger, the switching unite 106 utilizes the first recognition unit 101 with the client-based speech recognition. On the other hand, when the start trigger is the button trigger, the switching unit 106 utilizes the second recognition unit 102 with the server-based speech recognition.

Next, recognition process with the first recognition unit 101 (S4) is explained. The first recognition unit 101 has a small recognition vocabulary consisted of about 100 to 200 words, and enables the user to control the television 200 the by user's speech. FIG. 5 illustrates an example of the recognition vocabulary such as channel switching, volume control, and power-on/off. FIG. 6 illustrates other examples of the recognition vocabulary such as an activation of weather forecast and news. The recognition vocabulary may be fixed preliminarily, or be generated by utilizing some information dynamically. The first recognition unit 101 extracts features such as MFCC (Mel-Frequency Cepstral Coefficient), and performs pattern recognition between the features and pre-trained acoustic models. The first recognition unit 101 outputs recognition result with highest recognition likelihood to the television control unit 108. The television control unit 108 controls the television 200 based on the recognition result and displays information related to the recognition result (S11).

Next, the recognition process of the second recognition unit 102 (S5) is explained. The second recognition unit 102 operates based on server-based speech recognition. It has a large recognition vocabulary consisted of about hundred thousand words, and enables the user to search information such as the content of TV program listing by user speech. The large recognition vocabulary includes names of programs and names of cast extracted from EPG (Electronic Program Guide), and abbreviated expressions or nicknames of their names. The large recognition vocabulary may be updated regularly (for example, once a day) according to the change of the EPG.

Figure 7:
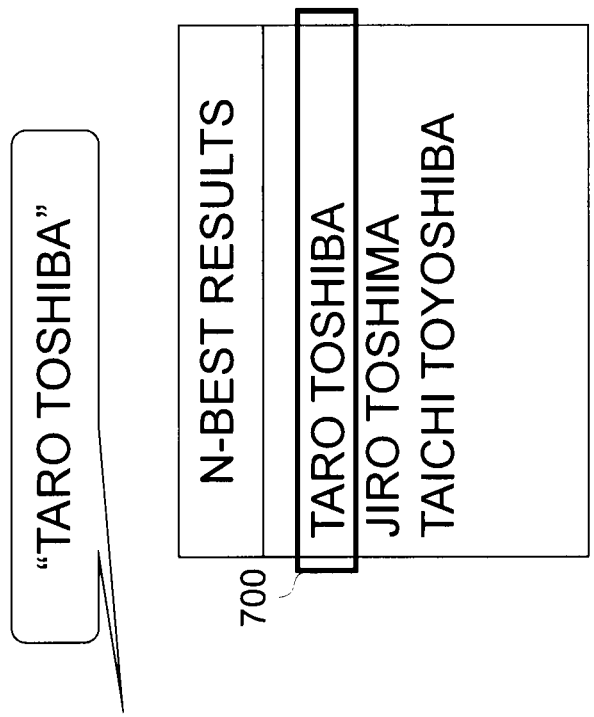
FIG. 7 is an example of N-best results displayed on a display.

The second recognition unit 102 executes a part of recognition process by utilizing the processing unit 112 of the external server 110. For example, the second recognition unit 102 extracts features such as MFCC, and the processing unit 112 performs pattern recognition between the features and pre-trained acoustic models. In other cases, the second recognition unit 102 only executes acquisition of the acoustic signal and sending the acoustic signal to the communication unit 107, and the processing unit 112 executes the other recognition process (feature extraction, pattern recognition, etc). In any cases, processing result of the processing unit 112 is send to the second recognition unit 102 via the communication unit 111. The second recognition unit 102 outputs N-best results to the television control unit 108. The television control unit 108 displays the list of the N-best results on the display 202 (S6). FIG. 7 illustrates an example of the N-best results (N is three) displayed on the display 202.

Next, the way to select the correct recognition result from the N-base is explained. There are two ways to select the correct recognition result (S7), selection by the remote controller 205 and selection by speech recognition. In the case of the selection by the remote controller 205, the user moves focus 700 to the correct recognition result by controlling an arrow key of the remote controller 205 and selects the results by pushing enter key (S8). When the top recognition result ("TARO TOSHIBA") of the list in FIG. 7 is selected, the television control unit 108 searches the TV programs in which "TARO TOSHIBA" appears from the EPG and displays a list of the TV programs on the display 202 shown in FIG. 8 (S11). Furthermore, the television control unit 108 may display information of the selected TV program and book recording of the TV program (S11).

Figure 9:
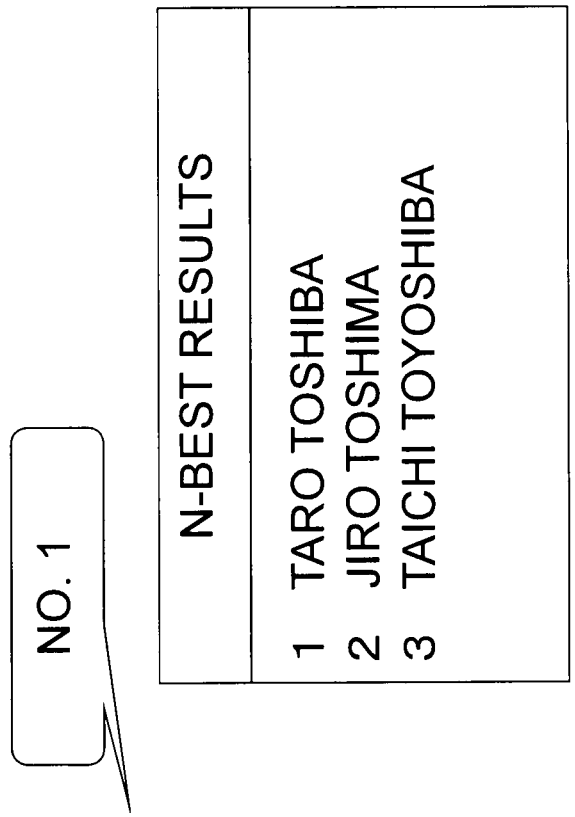
FIG. 9 is an example of ordered N-best results.

In the case of the selection by speech recognition, the apparatus 100 sets N-best results to recognition vocabulary of the first recognition unit 101 dynamically (S9). The first recognition unit 101 recognizes the user's speech acquired by the speech input unit 104 (S10). In this way, the user can select correct recognition result from the N-best results with the user's speech. By giving ordering numbers to the N-best results (as shown in FIG. 9) and adding the ordering numbers to the recognition vocabulary, the user can select the correct recognition results by speaking the ordering number. In the same manner, the user can select intended TV programs by the remote controller 205 or the speech recognition. FIG. 8 shows search result in which the intended TV programs is listed.

(Effect)

As mentioned-above, in the apparatus for speech recognition according to the first embodiment, tasks such as television control and information search are switched in response to start triggers (in different forms e.g., the button trigger and the sound trigger). Furthermore, the apparatus switches between the first recognition unit 101 (client-based speech recognition) and the second recognition unit 102 (server-based speech recognition) in response to the start triggers. Accordingly, user can switch speech recognition without being conscious about switching between the client-based and the server-based speech recognition.

Furthermore, the apparatus utilizes the client-based speech recognition (the first recognition unit 101) for the television control which needs only a small recognition vocabulary and the server-based speech recognition (the second recognition unit 102) for the information search which needs a large recognition vocabulary. Accordingly, the user can select optimal speech recognition for target task.

Furthermore, the apparatus activates the second recognition unit 102 for the television control in response to the sound trigger. Accordingly, the user can control the television without handling any devices such as remote controller.

Furthermore, the second recognition units 102 for the information search outputs more than one recognition results. Accordingly, it enables improved likelihood that a correct recognition result is included in the recognition results even in the case of speech recognition with a large recognition vocabulary.

Furthermore, the apparatus utilizes the first recognition unit 101 in order to select the correct result from the N-best results. Accordingly, the user can select the correct result without handling any devices such as remote controller.

Furthermore, the second recognition unit 102 updates the large recognition vocabulary regularly. Accordingly, the user can search recent information.

(The Second Embodiment)

Figure 10:
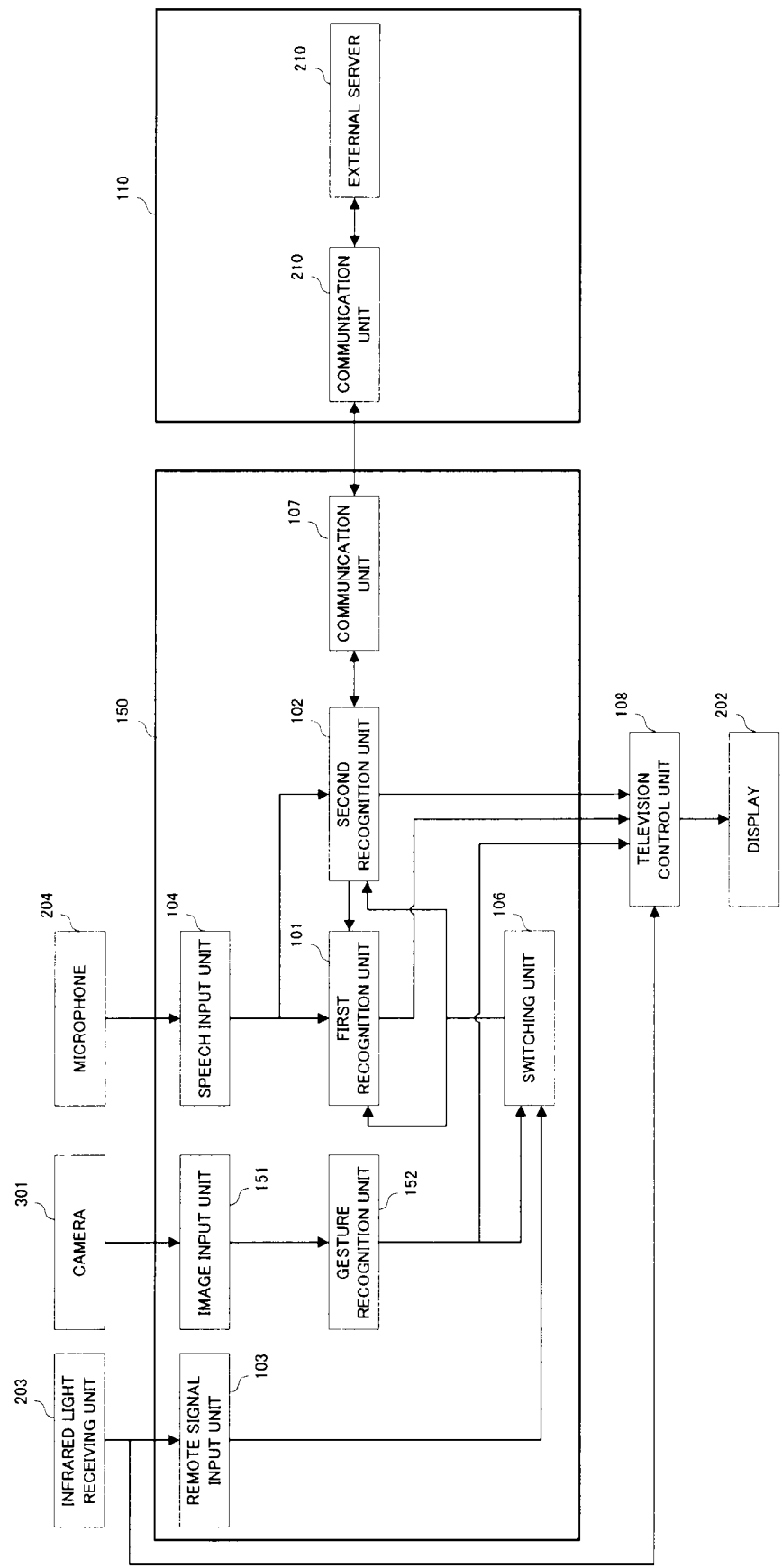
FIG. 10 is a block diagram of an apparatus for speech recognition according to a second embodiment.
Figure 11:
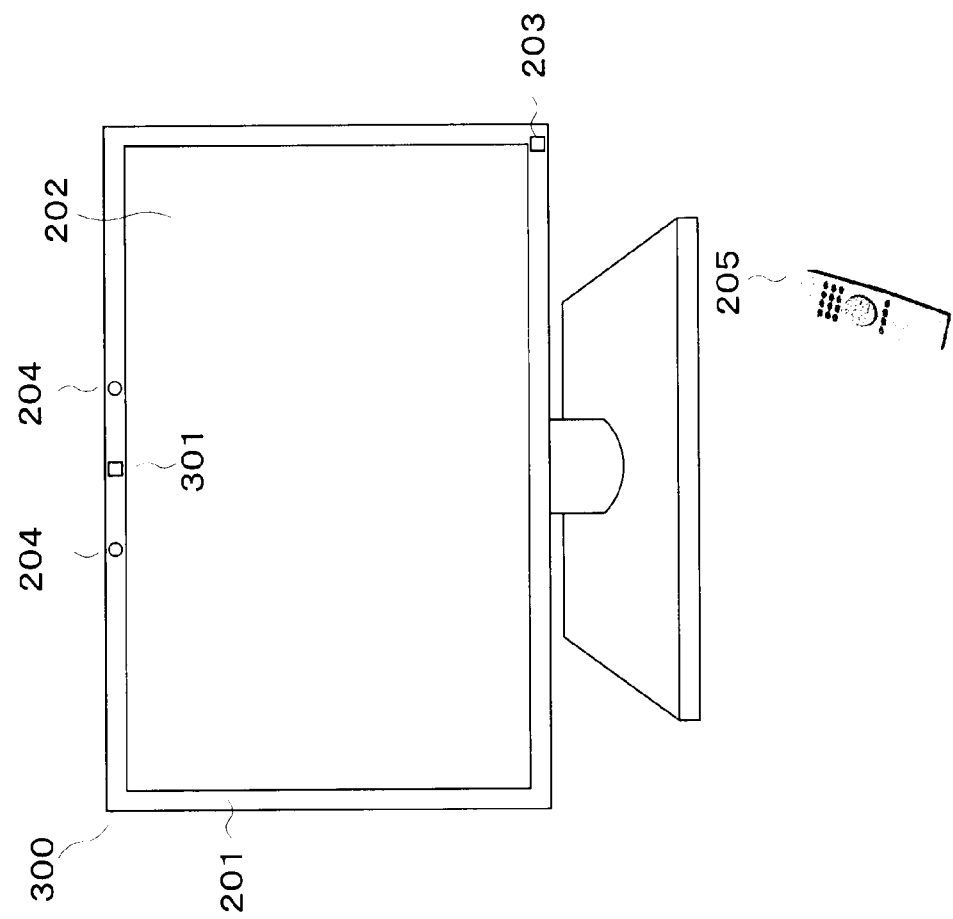
FIG. 11 is a general illustration of an appearance of a television according to the second embodiment.

FIG. 10 is a block diagram of an apparatus 150 for speech recognition according to the second embodiment. FIG. 11 is a general illustration of an appearance of a television 300 according to the second embodiment. The second embodiment is different from the first embodiment in that the television 300 includes a camera 301 for image intake, apparatus 150 includes an image input unit 151 to acquire the image from the camera 301 and a gesture recognition unit 152 to recognize a gesture of the image from the image input unit 151, and the sound detection unit 105 is omitted.

In this embodiment, the user is able to activate the start trigger by the button trigger or a user predefined gesture (gesture trigger). The predefined gesture is such as handwaving and pointing with a finger. The gesture recognition unit 152 recognizes the gesture of the image from the image input unit 151 and detects the gesture trigger when the predefined gesture is recognized.

The switching unit 106 switches both the first recognition unit 101 and the second recognition unit 102 in response to the start trigger. In this embodiment, the apparatus 150 utilizes the first recognition unit 101 when the gesture trigger is detected. The apparatus 150 utilizes the second recognition unit 102 when the button trigger is detected.

Figure 12:
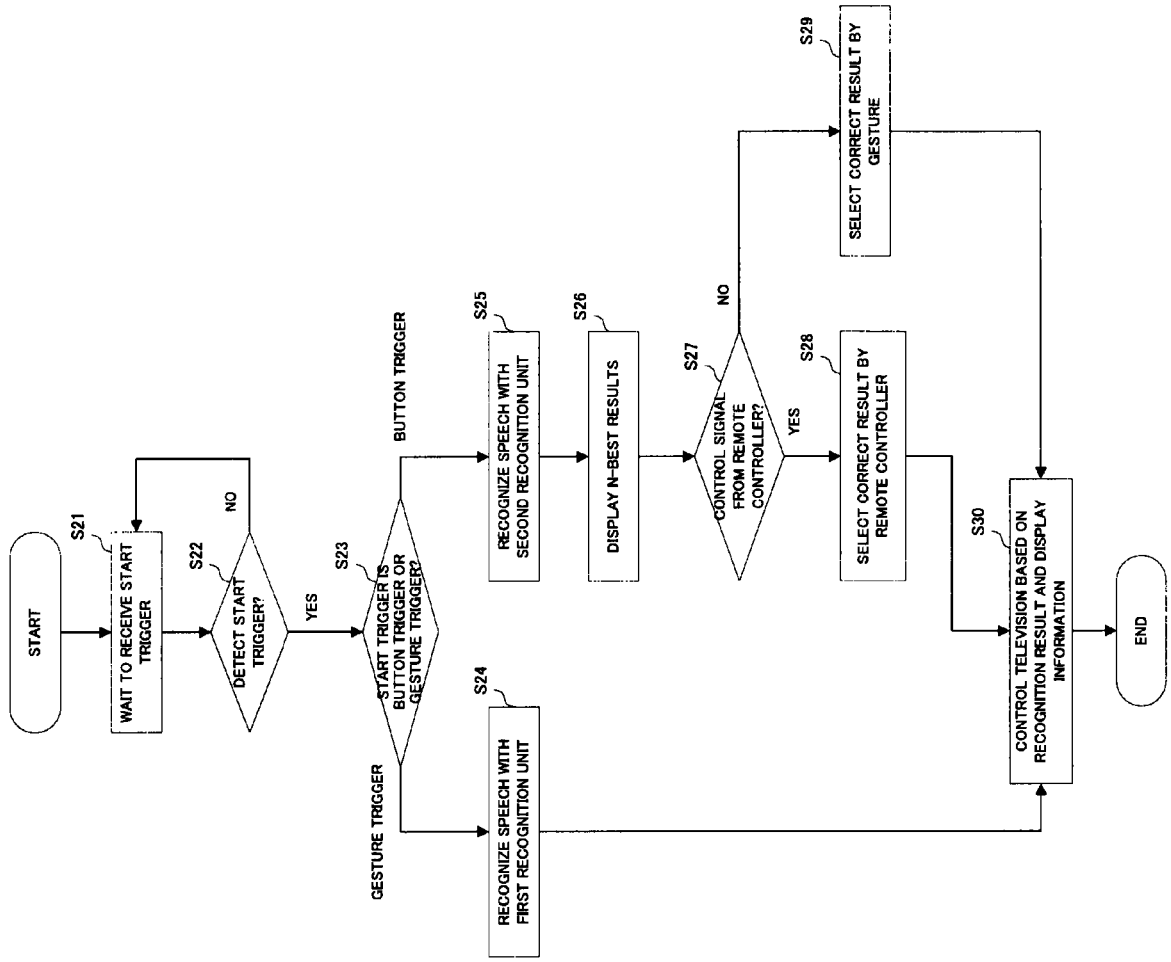
FIG. 12 is a flow chart illustrating processing of the apparatus according to the second embodiment.

FIG. 12 is a flow chart of processing of the apparatus 150 for speech recognition in accordance with the second embodiment. The second embodiment is different from the first embodiment in that process of S23 and S29.

At S23, the switching unit 106 switches between the first recognition unit 101 and the second recognition unit 102 in response to the start trigger. In this embodiment, the apparatus 150 utilizes the first recognition unit 101 (client-based speech recognition) when the start trigger is detected from the image acquired by the image input unit 151 (gesture trigger). The apparatus 150 utilizes the second recognition unit 102 (server-based speech recognition) when the start trigger is detected from the remote signal acquired by the remote signal input unit 103 (button trigger).

At S29, the apparatus 150 utilizes a predefined gesture in order to select correct a recognition result from the N-best results. For example, the user can move the focus 700 in FIG. 7 by the location of hand and determine the final location of the focus 700 by making a thumbs-up. The apparatus 150 utilizes the gesture recognition unite 152 in order to recognize the predefined gesture.

(Effect)

As mentioned-above, in the apparatus for speech recognition according to the second embodiment, the first recognition unit 101 is activated in response to the gesture trigger. Accordingly, the user can control the television without handling any devices such as remote controller.

According to the apparatus for speech recognition of at least one of the embodiments described above, tasks such as television control and information search are switched in response to two start triggers. Furthermore, the apparatus switches between the first recognition unit 101 (client-based speech recognition) and the second recognition unit 102 (server-based speech recognition) in response to the start triggers. Accordingly, the user can switch speech recognition without being conscious about switching between the client-based and the server-based speech recognition.

Furthermore, the apparatus utilizes the client-based speech recognition (the first recognition unit 101) for the television control which needs a small recognition vocabulary and the server-based speech recognition (the second recognition unit 102) for the information search which needs large recognition vocabulary. Accordingly, the user can select optimal speech recognition for a target task.

Furthermore, the user can activate the television control by sound trigger or gesture trigger. Accordingly, the user can control the television without handling any devices such as remote controller.

In the disclosed embodiments, the processing can be performed by a computer program stored in a computer-readable medium.

In the embodiments, the computer readable medium may be, for example, a magnetic disk, a flexible disk, a hard disk, an optical disk (e.g., CD-ROM, CD-R, DVD), an optical magnetic disk (e.g., MD). However, any computer readable medium, which is configured to store a computer program for causing a computer to perform the processing described above, may be used.

Furthermore, based on an indication of the program installed from the memory device to the computer, OS (operation system) operating on the computer, or MW (middle ware software), such as database management software or network, may execute one part of each processing to realize the embodiments.

Furthermore, the memory device is not limited to a device independent from the computer. By downloading a program transmitted through a LAN or the Internet, a memory device in which the program is stored is included. Furthermore, the memory device is not limited to one. In the case that the processing of the embodiments is executed by a plurality of memory devices, a plurality of memory devices may be included in the memory device.

A computer may execute each processing stage of the embodiments according to the program stored in the memory device. The computer may be one apparatus such as a personal computer or a system in which a plurality of processing apparatuses are connected through a network. Furthermore, the computer is not limited to a personal computer. Those skilled in the art will appreciate that a computer includes a processing unit in an information processor, a microcomputer, and so on. In short, the equipment and the apparatus that can execute the functions in embodiments using the program are generally called the computer.

While certain embodiments have been described, these embodiments have been presented by way of examples only, and are not intended to limit the scope of the inventions. Indeed, the novel embodiments described herein may be embodied in a variety of other forms, furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An apparatus for speech recognition, comprising:
a speech input unit configured to acquire acoustic signal;
a first recognition unit configured to recognize the acoustic signal;
a communication unit configured to communicate with an external server;
a second recognition unit configured to recognize the acoustic signal utilizing the external server via the communication unit;
a remote signal input unit configured to acquire a control signal from a remote controller;
a switching unit configured to switch between the first recognition unit and the second recognition unit for recognizing the acoustic signal in response to a start trigger;
wherein, the switching unit selects the second recognition unit when the start trigger is detected from the control signal, and the switching unit selects the first recognition unit when the start trigger is detected from the acoustic signal.

2. The apparatus according to claim 1, wherein the second recognition unit outputs more than one recognition result.

3. The apparatus according to claim 2, wherein the first recognition unit recognizes the acoustic signal by correlating the recognition result to a recognition vocabulary of the first recognition unit.

4. The apparatus according to claim 1, wherein the second recognition unit updates a recognition vocabulary of the second recognition unit regularly.

5. A television equipped with the apparatus according to claim 1, wherein a recognition vocabulary of the first recognition unit consists of vocabulary for television control, and a recognition vocabulary of the second recognition unit consists of vocabulary for information search.

6. An apparatus for speech recognition, comprising:
 a speech input unit configured to acquire acoustic signal;
 a first recognition unit configured to recognize the acoustic signal;
 a communication unit configured to communicate with an external server;
 a second recognition unit configured to recognize the acoustic signal utilizing the external server via the communication unit;
 a remote signal input unit configured to acquire a control signal from a remote controller;
 a image input unit configured to acquire an image,
 a switching unit configured to switch between the first recognition unit and the second recognition unit for recognizing the acoustic signal in response to a start trigger;
 wherein, the switching unit selects the second recognition unit when the start trigger is detected from the control signal, and the switching unit selects the first recognition unit when the start trigger is detected from the image.

7. A method for recognizing speech, comprising;
 acquiring an acoustic signal;
 recognizing the acoustic signal with a first recognition unit;
 communicating with an external server;
 recognizing the acoustic signal with a second recognition unit by utilizing the external server via the communication unit;
 acquiring a control signal from a remote controller;
 switching the first recognition unit and second recognition unit for recognizing the acoustic signal in response to a start trigger, including selecting the second recognition unit when the start trigger is detected from the control signal, and selecting the first recognition unit when the start trigger is detected from the acoustic signal.

* * * * *